(12) United States Patent
Lee (10) Patent No.: US 10,108,853 B2
(45) Date of Patent: Oct. 23, 2018

(54) APPARATUS AND METHOD TO ESTIMATE A DEGREE OF USER FATIGUE TO VIDEO CONTENT

(71) Applicant: Samsung Electronics Co., Ltd., Suwon-si (KR)

(72) Inventor: Hoshik Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 856 days.

(21) Appl. No.: 14/336,296

(22) Filed: Jul. 21, 2014

(65) Prior Publication Data

US 2015/0051887 A1    Feb. 19, 2015

(30) Foreign Application Priority Data

Aug. 13, 2013    (KR) .................. 10-2013-0096106

(51) Int. Cl.
*G06F 7/60*    (2006.01)
*G06K 9/00*    (2006.01)

(52) U.S. Cl.
CPC .................... *G06K 9/00335* (2013.01)

(58) Field of Classification Search
None
See application file for complete search history.

(56) References Cited

U.S. PATENT DOCUMENTS

| 6,614,927 | B1 | 9/2003 | Tabata |
| 9,087,131 | B1* | 7/2015 | Gundotra .......... G06F 17/30477 |
| 2008/0275830 | A1* | 11/2008 | Greig ................. G06K 9/00315 |
| | | | 706/21 |
| 2014/0111626 | A1* | 4/2014 | Zeng ................. H04N 13/0033 |
| | | | 348/51 |

FOREIGN PATENT DOCUMENTS

| JP | 2006-173696 A | 6/2006 |
| JP | 4149037 B2 | 7/2008 |
| KR | 1997-0024641 A | 5/1997 |
| KR | 10-0190975 B1 | 6/1999 |
| KR | 10-0614326 B1 | 8/2006 |

OTHER PUBLICATIONS

Kryter et al., Auditory Fatigue from Audio Analgesia, Apr. 1962, The Journal of the Acoustical Society of America.*

* cited by examiner

*Primary Examiner* — Craig C Dorais
(74) *Attorney, Agent, or Firm* — NSIP Law (57) ABSTRACT

An apparatus and a method to estimate a degree of user fatigue to video content are disclosed including a feature value calculating unit and a fatigue degree calculating unit. The feature value calculating unit is configured to calculate feature values corresponding to image and sound features in a video content. The fatigue degree calculating unit is configured to calculate a degree of user fatigue to the video content by applying the feature values to a fatigue degree estimation model.

20 Claims, 7 Drawing Sheets

APPARATUS AND METHOD TO ESTIMATE A DEGREE OF USER FATIGUE TO VIDEO CONTENT

CROSS-REFERENCE TO RELATED APPLICATION(S)

This application claims the benefit under 35 U.S.C. § 119(a) of Korean Patent Application No. 10-2013-0096106, filed on Aug. 13, 2013, in the Korean Intellectual Property Office, the entire disclosure of which is incorporated herein by reference for all purposes.

BACKGROUND

1. Field

The following description relates to an apparatus and a method to estimate a degree of user fatigue to video content.

2. Description of the Related Art

People receive various stimuli from a surrounding external environment. An appropriate external stimulus has an advantageous effect of stimulating brain activities, but an excessive stimulus may cause various negative side effects.

With the spread of diverse mobile devices, video contents may be viewed anywhere at any time. As a result, viewing time people spend on video contents has progressively increased, leading to an increase in time of exposure to unfiltered video contents shared through various video and mobile devices. Excessive audio-visual stimuli from such video contents may cause physiological or mental disorders for viewers, such as developmental disorders in children.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative example, there is provided an apparatus, including a feature value calculating unit configured to calculate feature values corresponding to image and sound features in a video content; and a fatigue degree calculating unit configured to calculate a degree of user fatigue to the video content by applying the feature values to a fatigue degree estimation model.

The feature value calculating unit may further include an image feature value calculating unit configured to calculate an image feature value corresponding to an image feature in the video content; a sound feature value calculating unit configure to calculate a sound feature value corresponding to sound feature in the video content; and an emotion feature value calculating unit configured to calculate an emotion feature value by applying at least one of the image feature value and the sound feature value to an emotion recognition model.

The emotion feature value may include an arousal level and a valence level.

The fatigue degree estimation model may include a first parameter that represents a correlation between the image feature value and a bio-signal change of a user; and a second parameter that represents a correlation between the bio-signal change and a fatigue degree.

The fatigue degree calculating unit may be further configured to calculate an auditory fatigue degree based on the sound feature value, a visual fatigue degree based on the image feature value, and a mental fatigue degree based on the emotion feature value.

The fatigue degree calculating unit may be further configured to calculate an overall fatigue degree based on the auditory fatigue degree, the visual fatigue degree, and the mental fatigue degree.

The fatigue degree calculating unit may be further configured to calculate an accumulative fatigue degree according to a lapse of viewing time, while a user is watching the video content.

The apparatus may also include a fatigue degree information generating unit configured to generate fatigue degree information to display the fatigue degree to a user.

In accordance with an illustrative example, there is provided a method, including calculating feature values corresponding to image and sound features in a video content; and calculating a degree of user fatigue to the video content by applying the feature values to a fatigue degree estimation model.

The calculating of the feature values may include calculating an image feature value corresponding to an image feature in the video content; calculating a sound feature value corresponding to a sound feature in the video content; and calculating an emotion feature value by applying at least one of the image feature value and the sound feature value to an emotion recognition model.

The emotion feature value may include an arousal level and a valence level.

The fatigue degree estimation model may include a first parameter that represents a correlation between the image feature value and a bio-signal change of a user; and a second parameter that represents a correlation between the bio-signal change and a fatigue degree.

The calculating of the fatigue degree may include calculating an auditory fatigue degree based on the sound feature value, a visual fatigue degree based on the image feature value, and a mental fatigue degree based on the emotion feature value.

The calculating of the fatigue degree may include calculating an overall fatigue degree based on the auditory fatigue degree, the visual fatigue degree, and the mental fatigue degree.

The calculating of the fatigue degree may include calculating an accumulative fatigue degree according to a lapse of viewing time, while a user is watching the video content.

The apparatus may also include generating fatigue degree information to display the fatigue degree to a user.

In accordance with an illustrative example, there is provided an apparatus, including: a feature value calculating unit configured to calculate image feature value, sound feature value, and emotion feature value associated with a video content; and a fatigue degree calculating unit configured to calculate a degree of user fatigue to video content by correlating bio-signal changes of a user to the image feature value, sound feature value, and emotion feature value.

The apparatus may also include a fatigue degree information generating unit configured to generate fatigue degree information to display the calculated degree of user fatigue.

The fatigue degree calculating unit may be further configured to calculate the degree of user fatigue to video content from a mean value based on a degree of visual fatigue, a degree of auditory fatigue, and a degree of mental fatigue, each degree based on the image feature value, the sound feature value, and the emotion feature value, respectively.

The fatigue degree calculating unit may be further configured to calculate the degree of user fatigue to video content by multiplying each of a degree of visual fatigue, a degree of auditory fatigue, and a degree of mental fatigue by a weighted value, and summing up each of the multiplied values, each degree based on the image feature value, the sound feature value, and the emotion feature value, respectively.

Other features and aspects may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, an apparatus and a method to estimate a degree of use fatigue to video content will be described in detail with reference to the accompanying drawings.

Figure 1:
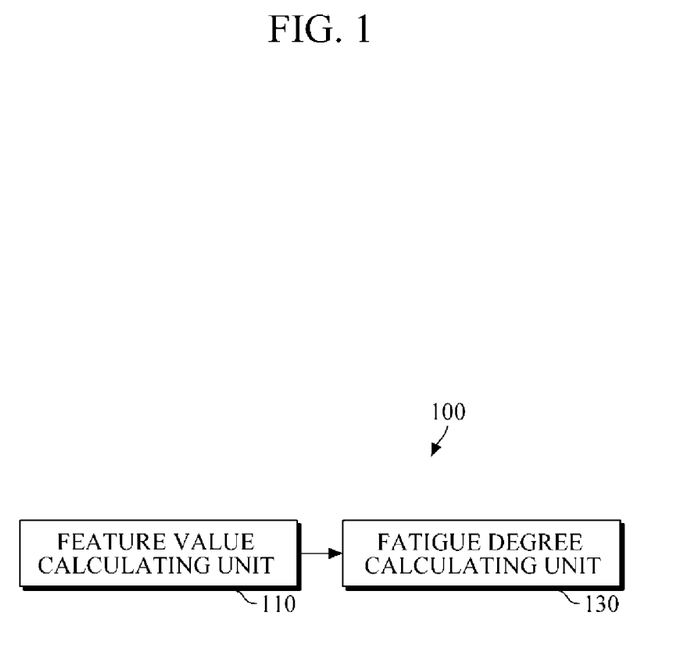
FIG. 1 is a block diagram illustrating an example of an apparatus to estimate a degree of user fatigue to video content, according to an embodiment.

FIG. 1 is a block diagram illustrating an example of a configuration of an apparatus 100 for estimating a degree of user fatigue to video content according to an embodiment.

Referring to FIG. 1, the apparatus 100 to estimate a degree of user fatigue to video content may be implemented in a video content playback apparatus. Further, the apparatus 100 to estimate a degree of user fatigue to video content may also be implemented in an apparatus providing video content, which provides video content to a video content playback apparatus through a wired/wireless network.

The video content playback apparatus may include all types of apparatuses configured to play or output back video content in visual or tactile form.

Examples of the video content playback apparatus includes mobile devices, such as a personal digital assistant (PDA), a portable multimedia player (PMP) and a mobile phone, a personal computer (PC), a hand-held PC, a notebook PC, an internet protocol television (IPTV) and a set-top box.

The apparatus to provide video content may include any type of structural apparatus that provides the video content to the video content playback apparatus through a wired or wireless network.

For example, the apparatus to provide the video content may be a server that provides a video content playback with real-time video content or downloadable video content.

A feature value calculating unit 110 illustrated in FIG. 1 calculates feature values corresponding to images and sounds included in video content. In one example, the feature values include an image feature value, a sound feature value, and an emotion feature value.

The image feature value refers to a feature value corresponding to images included in the video content. For example, the image feature value may be a numerical value representing features, such as a pixel size, brightness, a color, temporal change in brightness, temporal change in color, high frequency energy, gray level, a number of objects included in an image, and a moving speed of an object.

The sound feature value refers to a feature value corresponding to sounds included in the video content. For example, the sound feature value is a value that numerically represents amplitude, pitch, loudness, timbre, duration and frequency of a sound, temporal change in pitch, temporal change in frequency, and temporal change in timbre.

The emotion feature value refers to a feature value corresponding to emotions, which may be recognized from at least one of the images and the sounds included in video content. For example, the emotion feature value is a value that numerically represents an arousal level and a valence level of emotions, which are classified after being recognized by at least one of the images and the sounds included in video content.

A fatigue degree calculating unit 130 calculates a degree of user fatigue to video content by applying the feature values calculated in the feature value calculating unit 110 to a fatigue degree estimation model.

The degree of user fatigue to video content may be a value that numerically represents fatigue felt by a user while watching a video content.

According to an embodiment, the degree of user fatigue to video content includes a visual fatigue degree, an auditory fatigue degree, and a mental fatigue degree.

The visual fatigue degree is a value that numerically evaluates visual fatigue felt by a user from a visual stimulus when watching video content. For instance, the fatigue degree calculating unit 130 calculates the visual fatigue degree by applying the image feature value calculated at the feature value calculating unit 110 to the fatigue degree estimation model.

The auditory fatigue degree is a value that numerically evaluates auditory fatigue the user feels from an auditory stimulus when watching the video content. For instance, the fatigue degree calculating unit 130 calculates the auditory fatigue degree by applying the sound feature value calculated at the feature value calculating unit 110 to the fatigue degree estimation model.

The mental fatigue degree is a value that numerically evaluates mental fatigue felt by the user due to emotions or change in emotions recognized from at least one of the images and the sounds included in the video content when watching video content. For instance, the fatigue degree calculating unit 130 calculates the mental fatigue degree by applying at least one of the image feature value and the sound feature value calculated at the feature value calculating unit 110 to the fatigue degree estimation model.

According to an embodiment, the fatigue degree calculating unit 130 calculates an overall fatigue degree or the degree of user fatigue to video content based on the visual fatigue degree, the auditory fatigue degree, and the mental fatigue degree.

For example, the fatigue degree calculating unit 130 calculates the overall fatigue degree from a mean value obtained by calculating the visual fatigue degree, the auditory fatigue degree, and the mental fatigue degree.

In another example, the fatigue degree calculating unit 130 calculates an overall fatigue degree by calculating the visual fatigue degree, the auditory fatigue degree, and the mental fatigue degree, multiplying each of the calculated visual fatigue degree, the calculated auditory fatigue degree, and the calculated mental fatigue degree by a weighted value, and summing up each of the multiplied values.

According to an embodiment, a fatigue degree is an accumulative fatigue degree of video content that is currently playing. For example, the fatigue degree is an accumulative fatigue degree according to the lapse of viewing time, which is calculated while a user is watching video content.

Furthermore, a fatigue degree estimation model may be embodied as a linear or a non-linear model using a pre-acquired parameter.

For example, the fatigue degree estimation model may be embodied through the following equations 1 to 4.

$$dV_{i,j=sound} = \alpha_i S_{Enegy} + \beta_i dS_{Energy} + \gamma_i S_{Pitch} + \varepsilon_i dS_{Pitch},$$
$$i = HR, BP, BR \quad \text{[Equation 1]}$$

Equation 1 represents a relation between a calculated sound feature value and a change in bio-signals $dV_{i,j=sound}$ in a video content. Specifically, $S_{Energy}$ represents amplitude of sounds included in the video content, $dS_{Energy}$ represents a change in the amplitude of the sounds included in the video content, $S_{Pitch}$ represents pitch of the sounds included in the video content, $dS_{Pitch}$ represents a change in the pitch of the sounds included in the video content, respectively. Further, $\alpha_i$, $\beta_i$, $\gamma_i$ and $\varepsilon_i$ are pre-acquired parameters.

In addition, the sound feature value used in equation 1 is exemplary, and sound feature values different to or in addition to the sound feature value used in equation 1 may also be used. The parameters in equation 1 may be changed according to a sound feature value used.

$$dV_{i,j=display} = \chi_i f_{Brightness} + \omega_i df_{Brightness} + \phi_i df_{color} + \lambda_i f_{power,x} + \theta_i f_{power,y}, i = HR, BP, BR \quad \text{[Equation 2]}$$

Equation 2 represents a relation between a calculated image feature value and a change in bio-signals $dV_{i,j=display}$ in a video content. Specifically, $f_{Brightness}$ represents brightness of images included in the video content, $df_{Brightness}$ represents a change in brightness of the images included in the video content, $df_{color}$ represents a change in color of the images included in the video content, $f_{power,x}$ and $f_{power,y}$ represent high frequency energy in an X-axis and a Y-axis direction of the images included in the video content, respectively. Further, $\chi_i$, $\omega_i$, $\phi_i$, $\lambda_i$ and $\theta_i$ are pre-acquired parameters.

The image feature value used in equation 2 is exemplary, and image feature values different to or in addition to the image feature value used in equation 2 may also be used. In addition, the parameters in equation 2 may be changed according to an image feature value used.

$$dV_{i,j=emotion} = \sigma_i f_{arousal} + \tau_i df_{arousal} + \rho_i f_{valence} + \xi_i df_{valence},$$
$$i = HR, BP, BR \quad \text{[Equation 3]}$$

Equation 3 represents a relation between a calculated emotion feature value and a change in bio-signals $dV_{i,j=emotion}$ in a video content. Specifically, $f_{arousal}$ represents an arousal level, $df_{arousal}$ represents a change in the arousal level, $df_{color}$ represents a valence, and $df_{valence}$ represents a change in the valence. Further, $\sigma_i$, $\tau_i$, $\rho_i$ and $\xi_i$ are pre-acquired parameters.

The emotion feature value used in equation 3 is exemplary and image feature values different to or in addition to the emotion feature value used in equation 3 may also be used. In addition, the parameters in equation 3 may be changed according to an emotion feature value used.

$$F = \sum_i (a_i dV_{i,sound} + b_i dV_{i,display} + c_i dV_{i,smotion}), \quad \text{[Equation 4]}$$
$$i = HR, BP, BR$$

Equation 4 represents a correlation between a change in bio-signals ($dV_{i,sound}$, $dV_{i,display}$ and $dV_{i,emotion}$) and a fatigue degree (F), which is estimated from equations 1 to 3.

Also, $a_i$, $b_i$ and $c_i$ in equation 4 are pre-acquired parameters.

In one example, bio-signal changes estimated from equations 1 to 4 are heart rate (HR), blood pressure (BP), and breathing rate (BR), but are not limited thereto.

For example, the estimated bio-signal changes may be breath, brain waves, body temperatures, ocular reactions such as, frequency of blinking, movement of the pupils, and change in the size of the pupils, facial expressions, and gestures.

Furthermore, the pre-acquired parameters used in the fatigue degree estimation model may be obtained through machine learning, in which, based on gender, individuals of various age groups are selected to watch video content, and feature values calculated for the video content viewed by the individuals, bio-signal changes measured for the individuals, and survey results on a fatigue degree felt by the individuals are used as learning data.

For example, the pre-acquired parameters $\alpha_i$, $\beta_i$, $\gamma_i$, $\varepsilon_i$, $\chi_i$, $\omega_i$, $\phi_i$, $\lambda_i$, $\theta_i$, $\sigma_i$, $\tau_i$, $\rho_i$ and $\xi_i$ used in equations 1 to 3 may be obtained using, as learning data, image feature values, sound feature values, and emotion feature values calculated for video content viewed by the individuals, and bio-signal changes measured from the individuals while viewing the video content.

Further, the pre-acquired parameters $a_i$, $b_i$ and $c_i$ used in equation 4 may be obtained using, as learning data, bio-signal changes measured from the individuals while viewing video content, and survey results on a fatigue degree the individuals felt after viewing the video content.

Further, bio-signals measured from the individuals may include various kinds of bio-signals, such as heart rate, blood pressure, breath, brain waves, body temperature, ocular reactions, such as, frequency of blinking, movement of the pupils, and change in the size of the pupils, facial expressions, gestures, which are measured from a human body.

The feature values of the video content used as learning data, feature values used in the parameter estimation model according to bio-signal changes, parameters and estimated changes in bio-signals may be changed, adjusted, or re-acquired.

Figure 2:
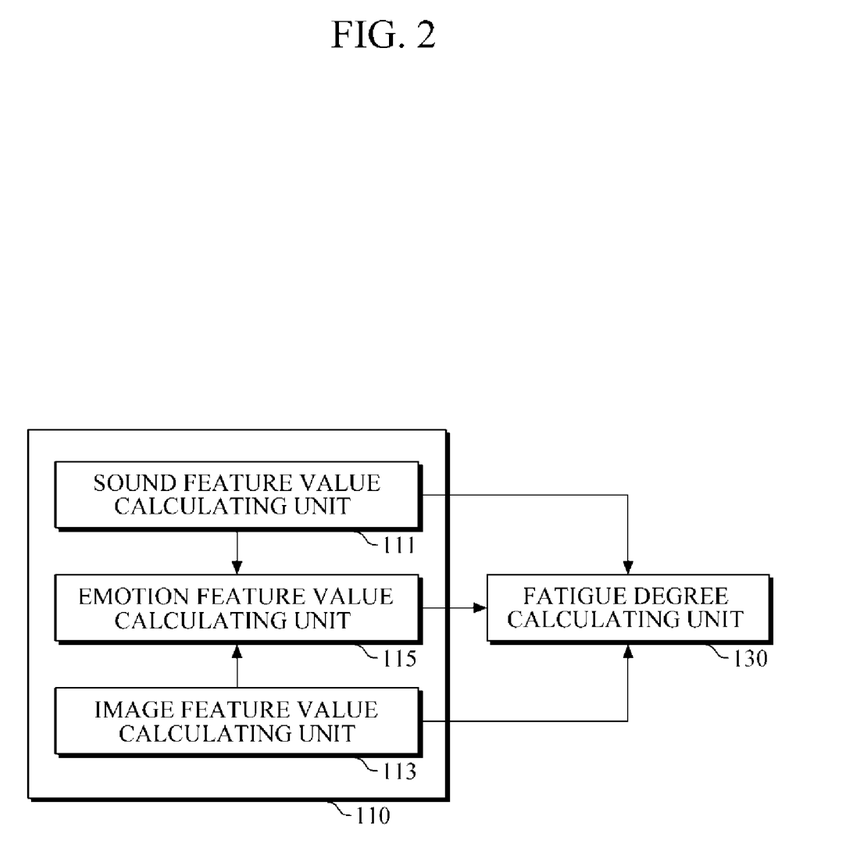
FIG. 2 is a block diagram illustrating an example of a feature value calculating unit, according to an embodiment.

FIG. 2 is a block diagram illustrating an example of a feature value calculating unit 110, according to an embodiment.

Referring to FIG. 2, a sound feature value calculating unit 111 calculates a sound feature value corresponding to sound features included in a video content.

In one illustrative example, the sound feature value is a value that numerically represents various sound features, such as sound amplitude, pitch, loudness, timbre, duration, frequency, temporal change in pitch, temporal change in frequency, and temporal change in timbre, which may provide an auditory stimulus to a viewer.

An image feature value calculating unit 113 calculates an image feature value corresponding to images in the video content.

In one example, the image feature value is a value that numerically represents various image features, such as brightness, color, temporal change in brightness, temporal change in color, a camera movement, high frequency energy included in images, gray level, a number of objects included in an image and a moving speed of an object, which provide a visual stimulus to a viewer.

An emotion feature value calculating unit 115 calculates an emotion feature value corresponding to emotions, which are classified after being recognized by at least one sound and image included in the video content.

The emotion feature value may be a value that is numerically represented by an arousal level and a valence level of emotions, which may be recognized by at least one sound and image included in the video content.

The emotion feature value calculating unit 115 obtains an emotion feature value by applying at least one of a sound feature value calculated in the sound feature value calculating unit 111 and an image feature value calculated in the image feature value calculating unit 113 to an emotion model.

The emotion model is a model based on learning data, at least one of sound feature values and image feature values calculated from various video contents, and an arousal level and a valence level, which are surveyed in advance.

A fatigue degree calculating unit 130 receives the sound feature value from the sound feature value calculating unit 111, the image feature value from the image feature value calculating unit 113, and the emotion feature value from the emotion feature value calculating unit 115 to generate an auditory fatigue degree, a visual fatigue degree, and a mental fatigue degree, respectively.

Figure 3:
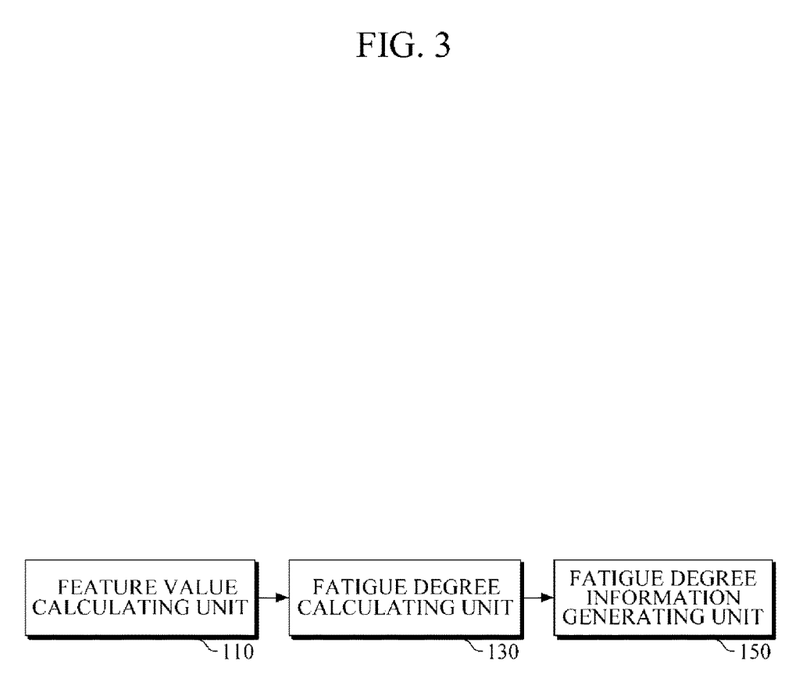
FIG. 3 is a block diagram illustrating an example of an apparatus to estimate a degree of user fatigue to video content, according to another embodiment.

FIG. 3 is a block diagram illustrating an apparatus to estimate a degree of user fatigue to video content, according to another embodiment.

Referring to FIG. 3, the apparatus 100 to estimate a degree of user fatigue to video content may further include a fatigue degree information generating unit 150, according to an exemplary embodiment.

The fatigue degree information generating unit 150 generates fatigue degree information to visually display the fatigue degree calculated at the fatigue degree calculating unit 130.

According to an embodiment, fatigue degree information generated at the fatigue degree information generating unit 150 includes a fatigue degree score, a visual image, or a warning conveying a fatigue degree calculated at the fatigue degree calculating unit 130.

Figure 4:
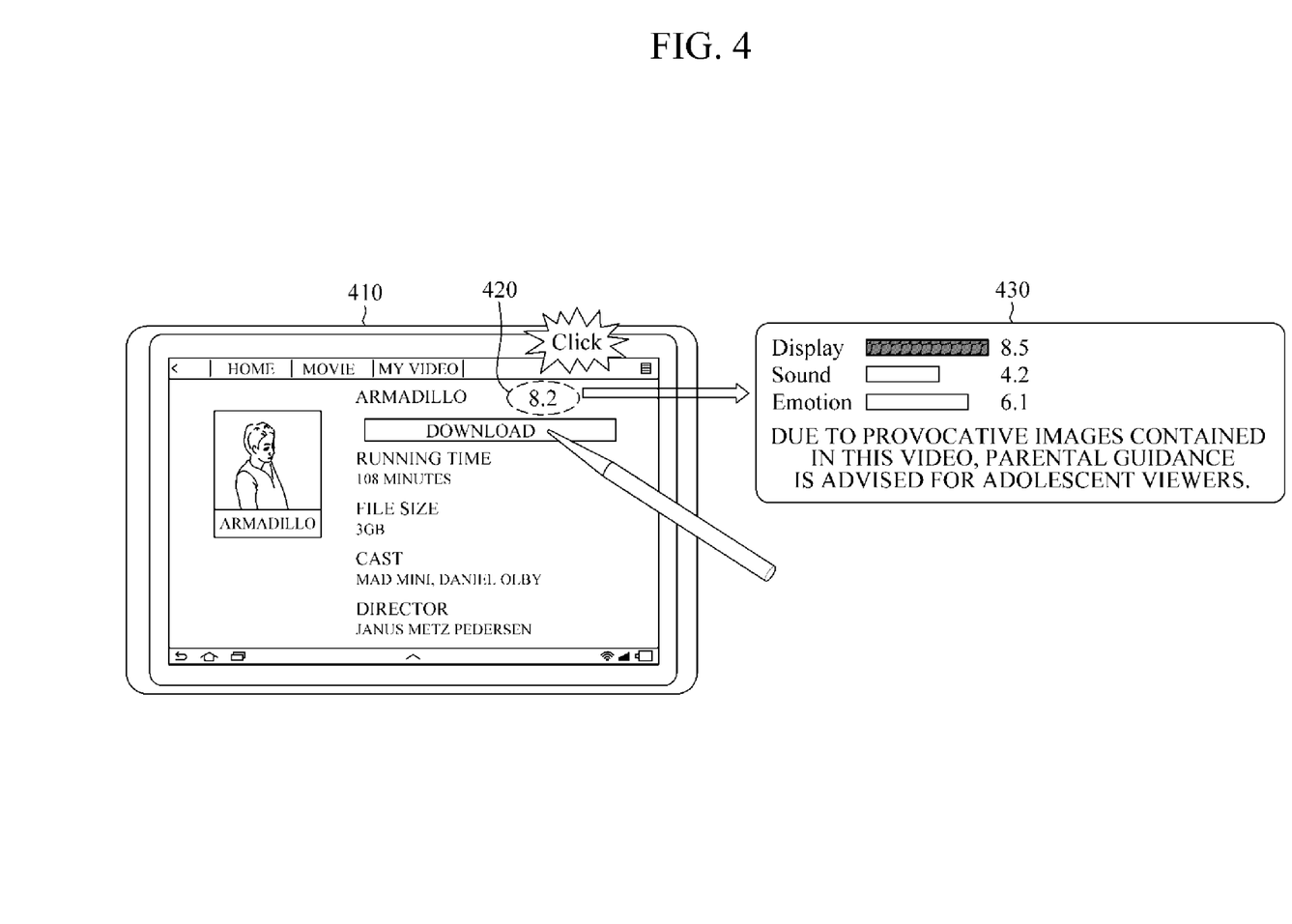
FIGS. 4 and 5 are views illustrating fatigue degree information.

Specifically, referring to an example illustrated in FIG. 4, a user may download and watch video content using a video content playback apparatus 410 through a wired/wireless network. In this case, the user may determine whether to download video content or not after selecting a video content to be downloaded and checking a title, a running time, a file size, and a plot, a cast of the selected video content.

Fatigue information generated in the fatigue degree information generating unit 150 may be provided to a user along with information about video content. That is, as in an illustrated example, when watching video content along with corresponding information thereon, a user may also be provided with a fatigue degree score 420 that represents a score of an estimated fatigue degree.

Further, if a user wishes to have additional detailed information, additional detailed fatigue degree information 430 may be displayed. In this case, as in the illustrated example, the additional detailed fatigue degree information 430 may include information having a visual fatigue degree, an auditory fatigue degree, and a mental fatigue degree expressed in a graph or as a fatigue degree score, as well as, characters such as warning expressions.

Figure 5:
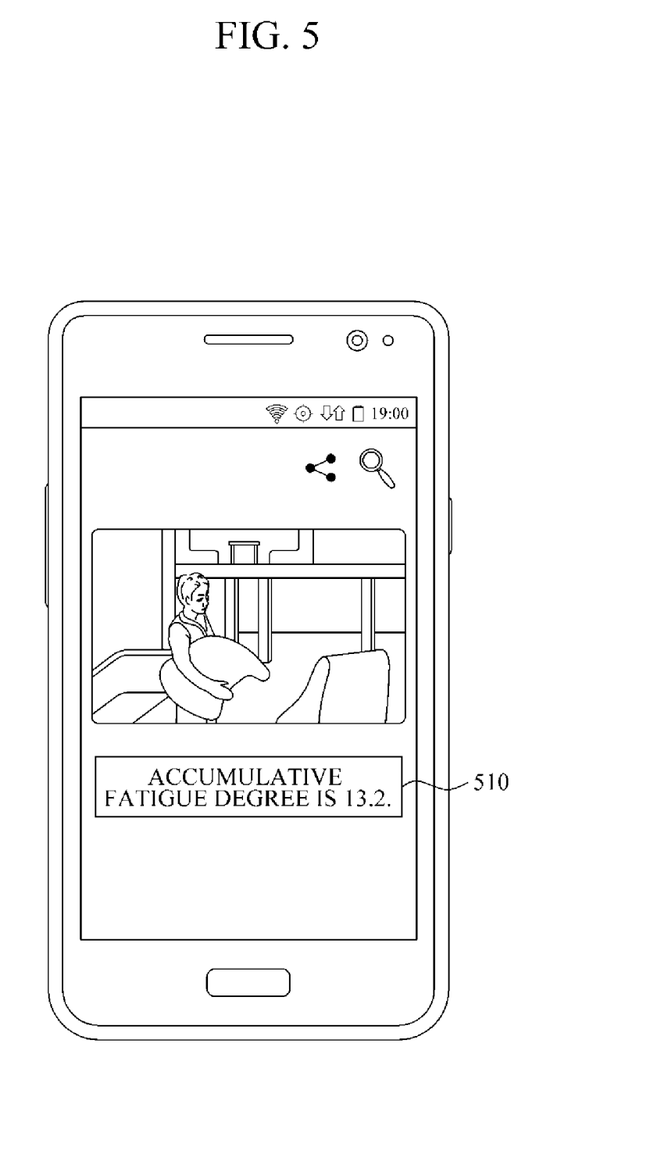

Referring to an example illustrated in FIG. 5, when a user is watching video content, fatigue degree information may be information that visually represents an accumulative fatigue degree according to the lapse of time that the user has been spending on viewing video content. Specifically, as in the illustrated example, the fatigue degree information generating unit 150 of FIG. 3 generates fatigue degree information 510 to display a fatigue degree score, which represents an accumulative fatigue degree according to the lapse of time that the user has spent viewing video content. The generated fatigue degree information may be displayed on a display screen, along with video content that is currently viewed.

It is to be appreciated that FIGS. 4 and 5 are merely exemplary views to explain fatigue degree information, and may be modified in various forms to visually provide a fatigue degree to a user and may be displayed in various devices including mobile devices.

The units described herein may be implemented using hardware components. For example, processors, controllers, central processing units (CPU), calculators, generators, and other structural processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

Figure 6:
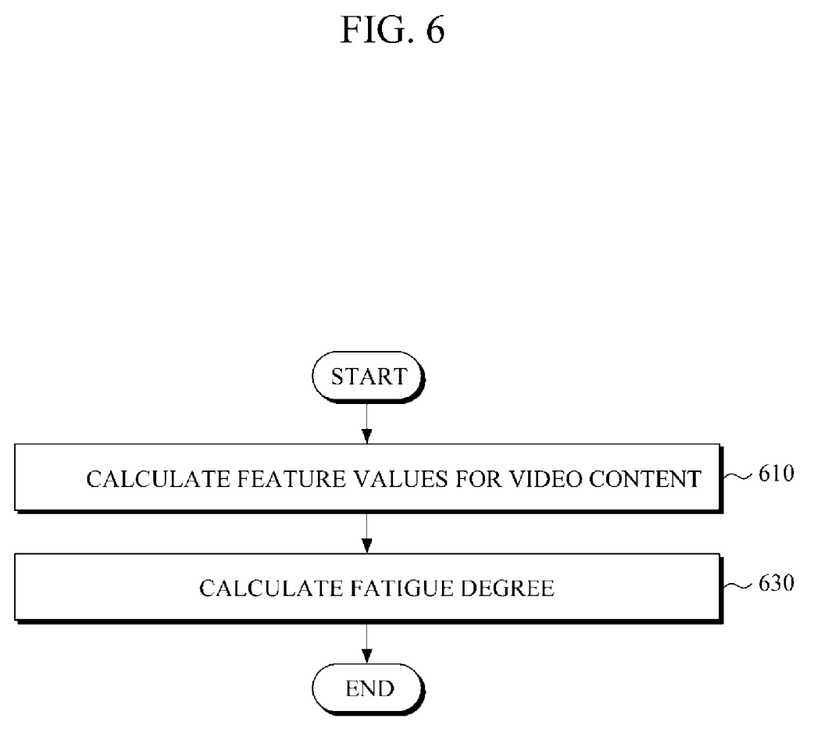
FIG. 6 is a flowchart illustrating a method to estimate a degree of user fatigue to video content, according to an embodiment.

FIG. 6 is a flowchart illustrating a method to estimate a user fatigue degree of video content according to an embodiment.

Referring to FIG. 6, at operation 610, the method calculates feature values corresponding to features of images and sounds included in a video content.

The feature value may include, at least one of, a sound feature value, an image feature value, and an emotion feature value.

In response to feature values being calculated for video content, at operation 630, the method calculates a degree of user fatigue to video content by applying the calculated feature values to a fatigue degree estimation model. According to an embodiment, a degree of user fatigue to video content may include, at least one of, a visual fatigue degree, an auditory fatigue degree, and a mental fatigue degree.

According to an embodiment, the degree of user fatigue to video content may be an overall fatigue degree based on, at least one of, the visual fatigue degree, the auditory fatigue degree, and the mental fatigue degree.

Further, according to an embodiment, a degree of user fatigue to video content may be an accumulative fatigue degree according to the lapse of time that the user has spent watching video content.

Figure 7:
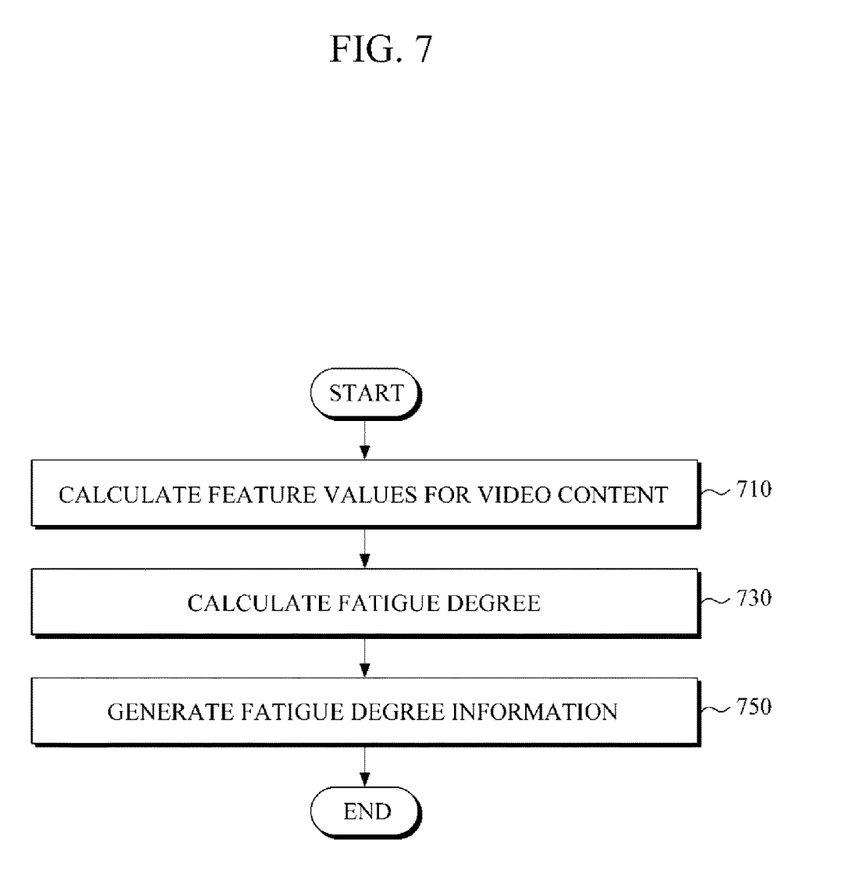
FIG. 7 is a flowchart illustrating a method to estimate a degree of use fatigue to video content, according to another embodiment.

FIG. 7 is a flowchart illustrating a method to estimate a degree of user fatigue to video content, according to another embodiment.

Referring to FIG. 7, at operation 710, the method calculates feature values corresponding to features of images and sounds included in video content. At operation 730, the method calculates a fatigue degree by applying the calculated feature values to a fatigue degree estimation model.

In addition, at operation 750, the method generates fatigue degree information to visually display the calculated fatigue degree to the user. The fatigue degree information may include, for example, images, such as a graph, or a fatigue degree score, which numerically displays a score of, at least one of, the visual fatigue degree, the auditory fatigue degree, the mental fatigue degree, and an overall fatigue degree.

It is to be understood that in the embodiment of the present invention, the operations in FIGS. 6-7 are performed in the sequence and manner as shown although the order of some operations and the like may be changed without departing from the spirit and scope of the configurations described above. In accordance with an illustrative example, a computer program embodied on a non-transitory computer-readable medium may also be provided, encoding instructions to perform at least the method described in FIGS. 6-7.

Program instructions to perform a method described in FIGS. 6-7, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A video content playback apparatus for creating a fatigue degree for a video content, comprising:
a processor comprising:
a feature value calculator configured to calculate an image feature value corresponding to image features in a video content and a sound feature value corresponding to sound features in the video content,
wherein the image feature value is a numerical value representing any one or any combination of any two or more of a pixel size, brightness, a color, a temporal change in brightness, a temporal change in color, high frequency energy, a gray level, a number of objects included in an image, or a moving speed of an object,
wherein the sound feature value is a numerical value representing any one or any combination of any two or more of an amplitude, a pitch, a loudness, a timbre, a duration and frequency of a sound, a temporal change in pitch, a temporal change in frequency, or a temporal change in timbre;
a fatigue degree calculator configured to
calculate, using biosignals of an individual measured while the individual views the video content, degrees of user fatigue to the video content, wherein the degrees of user fatigue correspond to the image feature value and the sound feature value, and
calculate, based on the degrees of user fatigue and a fatigue degree estimation model, an overall degree of user fatigue to the video content that enables video content selection according to user preferences; and
a fatigue degree information generator configured to modify a display of the video content based on the overall degree of user fatigue.

2. The apparatus of claim 1, wherein the feature value calculator further comprises:
an image feature value calculator configured to calculate the image feature value corresponding to the image feature in the video content;
a sound feature value calculator configure to calculate the sound feature value corresponding to the sound feature in the video content; and
an emotion feature value calculator configured to calculate an emotion feature value by applying at least one of the image feature value and the sound feature value to an emotion recognition model.

3. The apparatus of claim 2, wherein the emotion feature value comprises an arousal level and a valence level.

4. The apparatus of claim 2, wherein the fatigue degree estimation model comprises:
a first parameter that represents a correlation between the image feature value and a bio-signal change of the individual; and a second parameter that represents a correlation between the bio-signal change and a fatigue degree.

5. The apparatus of claim 2, wherein the fatigue degree calculator is further configured to calculate an auditory fatigue degree based on the sound feature value, a visual fatigue degree based on the image feature value, and a mental fatigue degree based on the emotion feature value.

6. The apparatus of claim 5, wherein the fatigue degree calculator is further configured to calculate the overall degree of user fatigue based on the auditory fatigue degree, the visual fatigue degree, and the mental fatigue degree.

7. The apparatus of claim 1, wherein the fatigue degree calculator is further configured to calculate an accumulative fatigue degree according to a lapse of viewing time, while a user is watching the video content.

8. The apparatus of claim 1, wherein the fatigue degree information generator is configured to modify the display of the video content by displaying the overall degree of user fatigue to a user.

9. A method of a video playback apparatus for creating a fatigue degree for a video content, comprising:
calculating, at a processor of the video playback apparatus, an image feature value corresponding to image features in a video content and a sound feature value corresponding to sound features in the video content,
wherein the image feature value is a numerical value representing any one or any combination of any two or more of a pixel size, brightness, a color, a temporal change in brightness, a temporal change in color, high frequency energy, a gray level, a number of objects included in an image, or a moving speed of an object,
wherein the sound feature value is a numerical value representing any one or any combination of any two or more of an amplitude, a pitch, a loudness, a timbre, a duration and frequency of a sound, a temporal change in pitch, a temporal change in frequency, or a temporal change in timbre;
calculating, at the processor and using biosignals of an individual measured while the individual views the video content, degrees of user fatigue to the video content, wherein the degrees of user fatigue correspond to the image feature value and the sound feature value;
calculating, at the processor and based on the degrees of user fatigue and a fatigue degree estimation model, an overall degree of user fatigue to the video content that enables video content selection according to user preferences; and
modifying a display of the video content based on the overall degree of user fatigue.

10. The method of claim 9, wherein the calculating of the image feature value and the sound feature value further comprises:
calculating an emotion feature value by applying at least one of the image feature value and the sound feature value to an emotion recognition model.

11. The method of claim 10, wherein the emotion feature value comprises an arousal level and a valence level.

12. The method of claim 10, wherein the fatigue degree estimation model comprises:

a first parameter that represents a correlation between the image feature value and a bio-signal change of the individual; and
a second parameter that represents a correlation between the bio-signal change and a fatigue degree.

13. The method of claim 10, wherein the calculating of the degrees of user fatigue comprises calculating an auditory fatigue degree based on the sound feature value, a visual fatigue degree based on the image feature value, and a mental fatigue degree based on the emotion feature value.

14. The method of claim 13, wherein the calculating of the overall degree of user fatigue comprises calculating the overall degree of user fatigue based on the auditory fatigue degree, the visual fatigue degree, and the mental fatigue degree.

15. The method of claim 9, wherein the calculating of the overall degree of user fatigue further comprises calculating an accumulative fatigue degree according to a lapse of viewing time, while a user is watching the video content.

16. The method of claim 9, wherein the modifying of the display of the video content comprises:
displaying the overall degree of user fatigue to a user.

17. A video content playback apparatus for creating a fatigue degree for a video content, comprising:
a feature value calculator configured to calculate an image feature value, a sound feature value, and an emotion feature value associated with a video content;
a fatigue degree calculator configured to
calculate a degree of visual fatigue to the video content by correlating bio-signal changes of a user to the image feature value,
calculate a degree of auditory fatigue to the video content by correlating the bio-signal changes of a user to the sound feature value,
calculate a degree of mental fatigue to the video content by correlating the bio-signal changes of a user to the emotion feature value, and
calculate an overall degree of user fatigue based on the degree of visual fatigue, the degree of auditory fatigue, and the degree of mental fatigue that enables video content selection according to user preferences; and
a fatigue degree information generator configured to modify a display of the video content based on the overall degree of user fatigue.

18. The apparatus of claim 17, wherein the fatigue degree information generator is configured to modify the display of the video content by displaying the calculated overall degree of user fatigue.

19. The apparatus of claim 17, wherein the fatigue degree calculator is further configured to calculate the overall degree of user fatigue to the video content from a mean value based on the degree of visual fatigue, the degree of auditory fatigue, and the degree of mental fatigue.

20. The apparatus of claim 17, wherein the fatigue degree calculator is further configured to calculate the overall degree of user fatigue to the video content by multiplying each of the degree of visual fatigue, the degree of auditory fatigue, and the degree of mental fatigue by a weighted value, and summing up each of the multiplied values.

* * * * *